(12) United States Patent
Cain et al.

(10) Patent No.: US 8,183,021 B2
(45) Date of Patent: May 22, 2012

(54) PROCESS FOR PRODUCING TRIGLYCERIDES

(75) Inventors: Frederick William Cain, Voorburg (NL); Ulrike Schmid, Wormerveer (NL)

(73) Assignee: Loders Croklaan B.V., Wormerveer (NL)

( * ) Notice: Subject to any disclaimer, the term of this patent is extended or adjusted under 35 U.S.C. 154(b) by 859 days.

(21) Appl. No.: 11/991,611

(22) PCT Filed: Sep. 8, 2006

(86) PCT No.: PCT/GB2006/003339
§ 371 (c)(1),
(2), (4) Date: Nov. 14, 2008

(87) PCT Pub. No.: WO2007/029015
PCT Pub. Date: Mar. 15, 2007

(65) Prior Publication Data
US 2009/0104673 A1    Apr. 23, 2009

(30) Foreign Application Priority Data
Sep. 8, 2005  (EP) ..................... 05255490

(51) Int. Cl.
*C12P 7/64*   (2006.01)
*C11C 1/00*   (2006.01)
*C09K 3/00*   (2006.01)
*C11C 3/00*   (2006.01)

(52) U.S. Cl. .................. 435/134; 435/271; 252/182.12; 554/121; 554/163

(58) Field of Classification Search .................. 435/134, 435/271; 554/163, 121; 252/182.12
See application file for complete search history.

(56) References Cited

U.S. PATENT DOCUMENTS

| | | | |
|---|---|---|---|
| 4,268,527 A | 5/1981 | Matsuo et al. | |
| 4,876,107 A | 10/1989 | King et al. | 426/601 |
| 5,288,619 A | 2/1994 | Brown et al. | |
| 6,090,598 A | 7/2000 | Yamaguchi et al. | |
| 2005/0145475 A1 | 7/2005 | Okada et al. | 203/34 |

FOREIGN PATENT DOCUMENTS

| | | |
|---|---|---|
| EP | 0209327 | 1/1987 |
| EP | 0 245 076 A2 | 11/1987 |
| EP | 0 882 797 A2 | 12/1998 |
| EP | 1477070 | 11/2004 |
| GB | 1577933 | 10/1980 |
| GB | 2147004 A | 5/1985 |

OTHER PUBLICATIONS

Nakaya et al., Transesterification between triolein and stearic acid catalyzed by lipase in CO2 at various pressures, Biotechnology Techniques, 12(12):881-884 (1998).
Seriburi et al., "Enzymatic transesterification of Triolein and Stearic acid and solid fat content of their products", Journal of the American Oil Chemists' Society, 75(4):511-516 (1998).
Chen et al., "Synthesis of the structured lipid 1,3-Dioleoy1-2-palmitoylglycerol from palm oil", Journal of the American Oil Chemists' Society, 81(6):525-532 (Jun. 2004).
Goto et al., "Enzymatic Interesterification of Triglyceride with Surfactant-Coated Lipase in Organic Media", Biotechnology and Bioengineering, 45(1):27-32 (Jan. 5, 1995).
Filer et al., "Triglyceride Configuration and Fat Absorption by the Human Infant" J. Nutrition, 99:293-298, Nov. 1969.
Freeman et al., "Intramolecular fatty acid distribution in the milk fat triglycerides of several species" J. Dairy Sci., 48:853-858 (1965).
Soumanou et al., "Synthesis of structured triglycerides by lipase catalysis", Fett-Lipid, 100(4-5):156-160 (1998).
Soumanou et al., "Two-step Enzymatic Reaction for the Synthesis of Pure Structured Triacylglycerides", Journal of the American Oil Chemists' Society, 75(6):703-710 (1998).
Schmid et al., "Highly selective synthesis of 1,3-Oleoyl-2-Palmitoylglycerol by lipase catalysis", Biotechnology and Bioengineering, 64(6):679-684 (1999).
Chen et al., "Synthesis of the structured lipid 1,3-Dioleoyl-2-palmitoylglycerol from palm oil", Journal of the American Oil Chemists' Society, 81(6):525-532 (Jun. 2004).
Quinlan et al., "Modification of triglycerides by lipases: process technology and its application to the production of nutritionally improved fats", Inform, 4(5):580, 582-585 (May 1993).
Nagao et al., "Use of thermostable Fusarium heterosporum Lipase for production of structured lipid containing oleic and palmitic acids in organic solvent-free system", Journal of the American Oil Chemists' Society, 78(2):167-172 (2001).

*Primary Examiner* — Herbert J Lilling
(74) *Attorney, Agent, or Firm* — Morgan, Lewis & Bockius LLP

(57) ABSTRACT

A process for producing triglycerides comprises: (a) subjecting a first triglyceride comprising at least 40% by moles of oleic acid residues, based on total acyl groups in the triglyceride, to a reaction with stearic acid, at least one ester of stearic acid or a mixture thereof, to obtain a composition comprising 1,3-distearoyl 2-oleoyl glyceride and trioleoyl glyceride; (b) treating the composition to form a first fraction having an increased amount by weight of oleoyl groups compared to said composition and a second fraction having an increased amount by weight of stearoyl groups compared to said composition; (c) hydrolysing the first fraction to form oleic acid; and (d) reacting said oleic acid or an ester thereof with a triglyceride comprising at least 50% by moles of palmitic acid residues, based on total acyl groups, to form a composition comprising 1,3-dioleoyl 2-palmitoyl glyceride.

7 Claims, No Drawings

PROCESS FOR PRODUCING TRIGLYCERIDES

This invention relates to a process for producing triglycerides. In particular, the invention relates to a process for producing 1,3-dioleoyl 2-palmitoyl glyceride (OPO) and/or 1,3-distearoyl 2-oleoyl glyceride (StOSt).

Triglycerides are important components of many products, especially food products. The triglyceride 1,3-dioleoyl-2-palmitoyl glyceride is an important glyceride component of human milk fat.

Fat compositions containing similar amounts of the principal fatty acids found in human milk fat may be derived from oils and fats of vegetable origin. However, there remains a significant difference in composition between milk replacement fats, derived from natural sources, and that of human milk fat. This difference arises because most glycerides of vegetable origin are unsaturated in the 2-position. In contrast, a substantial amount of palmitic acid occupies the 2-position of glycerides in human milk fat.

The difference in the distribution of acids along the glyceride positions is believed to have important dietary consequences. The distribution of fatty acids in the triglycerides of some milk fats of nutritional importance was studied by Freeman et al, (J. Dairy Sci., 1965, p. 853), who reported that human milk fat contains a greater proportion of palmitic acid in the 2-position, and a greater proportion of stearic acid and oleic acid in the 1,3-positions than the milk fat of ruminants. The greater absorption of palmitic acid in the 2-position of triglycerides by infants was reported by Filer et al (J. Nutrition, 99, pp. 293-298), who suggest that the relatively poor absorption of butter fat by infants compared with human milk fat is attributable to its substantially uniform distribution of palmitic acid between the glyceride positions of the fat.

In order to most closely match the chemical and/or physical properties of triglyceride fats or oils obtained from natural sources, to that of human milk fat, therefore, it is necessary to control the distribution of the fatty acid residues on the glyceride positions.

EP-A-0209327 discloses milk replacement fat compositions comprising the triglyceride 1,3-dioleoyl-2-palmitoyl glyceride. According to EP-A-0209327, these fat compositions can be obtained by subjecting fatty mixtures comprising glycerides consisting substantially of more saturated 2-palmitoyl glycerides to a rearrangement catalyst, such as a lipase, which is regiospecific in activity in the 1- and 3-positions of the glycerides. Enzymatic processes of this kind are also described in GB 1577933. Under the influence of the catalyst, unsaturated fatty acid residues may be introduced into the 1- and 3-positions of the 2-palmitoyl glycerides by exchange with unsaturated free fatty acids or their alkyl esters.

There remains a need to provide a more efficient and/or cost effective process for the production of triglycerides such as 1,3-dioleoyl-2-palmitoyl glyceride (OPO) and 1,3-distearoyl 2-oleyl glyceride (StOSt).

The present invention provides, in one aspect, a process for producing triglycerides which comprises:
(a) subjecting a first triglyceride comprising at least 40% by moles of oleic acid residues, based on total acyl groups in the triglyceride, to a reaction with stearic acid, at least one ester of stearic acid or a mixture thereof, to obtain a composition comprising 1,3-distearoyl 2-oleoyl glyceride and trioleoyl glyceride;
(b) treating the composition to form a first fraction having an increased amount by weight of oleoyl groups compared to said composition and a second fraction having an increased amount by weight of stearoyl groups compared to said composition;
(c) hydrolysing the first fraction to form oleic acid; and
(d) reacting said oleic acid or an ester thereof with a triglyceride comprising at least 50% by moles of palmitic acid residues, based on total acyl groups, to form a composition comprising 1,3-dioleoyl 2-palmitoyl glyceride.

In another aspect, the invention provides the use of oleic acid or an ester thereof for the production of a composition comprising 1,3-dioleoyl 2-palmitoyl glyceride, wherein the oleic acid or ester thereof is formed by a process comprising subjecting a triglyceride comprising at least 40% by moles of oleic acid residues, based on total acyl groups in the triglyceride, to a reaction with stearic acid, at least one ester of stearic acid or a mixture thereof, to obtain a composition comprising 1,3-distearoyl 2-oleoyl glyceride and trioleoyl glyceride, and, optionally, hydrolysing the trioleoyl glyceride.

In yet another aspect, the invention provides the use of a triglyceride in a process for producing both 1,3-dioleoyl 2-palmitoyl glyceride and 1,3-distearoyl 2-oleoyl glyceride.

The term "stearin" as used in this specification, includes a triglyceride mixture or fat blend from which at least 10% by weight of the lower melting constituents have been removed by some kind of fractionation, e.g., dry fractionation, Lanza fractionation or solvent fractionation.

The term fatty acid, fatty acyl groups, and related terms used herein refer to saturated or unsaturated, straight chain carboxylic acids having from 4 to 24 carbon atoms, preferably from 12 to 22 carbon atoms. Unsaturated acids may comprise one, two, or more double bonds, preferably one or two double bonds.

The term alkyl, as used herein, refers to straight chain or branched saturated hydrocarbons having from 1 to 6 carbon atoms.

The first triglyceride used in step (a) of the present invention is preferably high oleic sunflower oil (HOSF) or a fraction thereof. Fractions include products obtained from HOSF by fractionation, such as solvent or dry fractionation, which alters the composition of the product. The high oleic sunflower oil or fraction thereof has at least 40%, preferably at least 50%, such as at least 60%, and most preferably at least 70% by moles of oleic acid residues, based on total acyl groups in the triglyceride. High oleic sunflower oil is typically obtained from the oil contained in the seeds of sunflowers.

Before the first triglyceride is reacted with stearic acid, or an ester of stearic acid, or a mixture thereof in step (a) of the process of the invention, the first triglyceride is optionally degummed and/or refined, using standard techniques known in the art.

Steps (a) and/or (d) in the process of the present invention are preferably carried out in the presence of an enzyme, more preferably a lipase.

Step (a) is typically carried out in the presence of a 1,3 specific lipase as a biocatalyst. During step (a), the fatty acids on the 2-position of the first glyceride typically do not change (for example, less than 10% by number (or moles) of fatty acyl groups in the 2-position, more preferably less than 5%, such as less than 1%) change during the process.

During step (a), saturated stearoyl fatty acid residues are introduced into the 1- and 3-positions of the first glyceride. The reaction takes place between the first triglyceride and the stearic acid, at least one ester of stearic acid, a mixture of stearic acid with one or more esters of stearic acid or a mixture of two or more esters of stearic acid. Preferred esters of stearic acid are glycerides (including mono, di and triglycerides) and alkyl esters with alcohols having from 1 to 6 carbon atoms.

The reaction in step (a) is performed to reach or approach equilibrium at a conversion ratio to 1,3-distearoyl 2-oleoyl glyceride of a minimum of 50%, preferably at least 60%, most preferably at least 70% by moles based on the first glyceride.

The product of step (a) will typically comprise a mixture including 1,3-distearoyl 2-oleoyl glyceride, triolein (i.e., trioleoyl glyceride), 1,2-dioleoyl 3-stearoyl glyceride and, depending on the selectivity of the process, possibly also 1,2-distearoyl 3-oleoyl glyceride.

The composition obtained in step (a) is treated in step (b) in order to separate at least a portion, preferably at least 70%, more preferably at least 80%, such as at least 90%, most preferably at least 95% by weight, of the 1,3-distearoyl 2-oleoyl glyceride in a first fraction from a second fraction. The second fraction preferably comprises at least 70% by weight of the total trioleoyl glyceride produced in step (a).

The first and second fractions obtained in step (b) in the process of the present invention may be separated from the composition produced in step (a) by conventional methods. The separation may be effected by fractionation of the composition obtained in (a), for example, by solvent (wet) fractionation, Lanza fractionation, or dry fractionation, such as multi-stage counter current dry fractionation, of the composition obtained in step (a). For example, the first and second fractions may be prepared by a method comprising wet fractionation using an organic solvent (e.g., a $C_3$ to $C_{10}$ ketone, such as acetone) or an aqueous medium comprising surfactants.

In step (b), the increased amount by weight of oleoyl (including oleic and oleoyl) groups in the first fraction compared to the composition obtained in step (a) is preferably greater than 10%, more preferably greater than 20%, such as 30%, most preferably greater than 40% by weight of the oleoyl (including oleic and oleoyl) groups present, based on the weight of the oleoyl (including oleic and oleoyl) groups in the composition obtained in (a).

The increased amount by weight of stearoyl (including stearic and stearoyl) groups in the second fraction compared to the composition obtained in step (a) is preferably greater than 10%, more preferably greater than 20%, such as 30%, most preferably greater than 40% by weight of the stearoyl (including stearic and stearoyl) groups present, based on the weight of the stearoyl (including stearic and stearoyl) groups in the composition obtained in (b).

The second fraction obtained in step (b) according to the process of the present invention is preferably treated such that it is enriched in 1,3-distearoyl 2-oleoyl glyceride.

The invention may comprise a further step of purifying the 1,3-distearoyl 2-oleoyl glyceride obtained as the second fraction in step (b). 1,3-Distearoyl 2-oleoyl glyceride (also known as StOSt) is a valuable commercial product. For example, it may be used, either alone or together with other glycerides such as 1,3-dipalmitoyl 2-oleoyl glyceride, as a cocoa butter equivalent or substitute.

Hydrolysis of the first fraction in step (c) of the process of the invention may be carried out by any method used for the hydrolysis of fats and oils known in the art, for example, by saponification (using an alkali) or acid hydrolysis or by enzymic hydrolysis, for example by contacting the first fraction with a lipase. The lipase may or may not selectively hydrolyse oleic acid fatty acid residues in preference to other fatty acid residues.

In the hydrolysis reaction of step (c), the oleoyl residues are hydrolysed to the corresponding free fatty acid, oleic acid, or its salts (such as sodium or potassium salts; the identity of the anion will depend on the reagent used for hydrolysis).

Following hydrolysis in step (c), the oleic acid is optionally purified, for example to a purity of at least 50% by weight more preferably at least 60% by weight, such as at least 70%, at least 80%, at least 90% or at least 95% by weight.

Alternatively or additionally, the oleic acid may be converted to an ester before reaction in step (d) of the process. For example, the oleic acid may be converted into a glyceride (including mono, di and tri glycerides) or an alkyl ester (such as a $C_1$ to C6 alkyl ester). The oleic acid used in step (d) of the process may be free oleic acid alone, a single ester, a mixture of free oleic acid with one or more esters of oleic acid or a mixture of two or more esters of oleic acid.

The oleic acid of step (c), optionally after further purification and/or conversion to one or more esters, is reacted with a triglyceride in step (d) to form a composition comprising 1,3-dioleoyl 2-palmitoyl glyceride.

In an alternative embodiment of the invention, hydrolysis step (c) may be omitted and the first fraction may be used directly in step (d).

The triglyceride used as the other starting material in step (d) of the process of the present invention preferably comprises at least 50%, preferably at least 60%, most preferably at least 70% by moles of palmitic acid residues, based on total acyl groups. Preferably, the triglyceride used in step (d) comprises glycerides which contain palmitic acid in the 2-position of the glycerol backbone, which may be obtained from the high melting fraction of palm oil. Palm oil contains up to 12% by weight trisaturated acid glycerides including tripalmitin. Generally, a top fraction contains 4 parts tripalmitin and 1 part of symmetrical disaturated triglycerides, by weight. The high melting fraction of palm oil is preferably fractionated to obtain palm oil stearin preferably comprising saturated 2-palmitoyl glycerides, typically in an amount of greater than 60% by weight, such as greater than 70% by weight or greater than 75% by weight. Fractionation of palm oil may be carried out by solvent (wet) fractionation, Lanza fractionation, or dry fractionation, such as multi-stage countercurrent dry fractionation, of palm oil. The palm oil can be crude palm oil, refined palm oil, fractions of palm oil or mixtures thereof. Preferably, the palm oil is subjected to wet fractionation using an organic solvent (e.g., a $C_3$ to $C_{10}$ ketone, such as acetone) or an aqueous medium comprising surfactants. Palm oil stearin is typically-refined, which preferably involves bleaching and deodorising. The bleaching of the palm oil stearin is preferably performed at high temperatures, preferably above 100° C., such as 110° C. In the deodorising step, volatile impurities are removed from the palm oil stearin at temperatures above 200° C. to yield deodorised palm oil stearin. The impurities removed in the deodorising step commonly include free fatty acids, aldehydes, ketones, alcohols and other hydrocarbon impurities. The bleaching and deodorising are performed under standard conditions known in the art and may be carried out in a single process step or two or more process steps. For example, the steps may be carried out at reduced pressures (e.g., 10 mm Hg or below), wherein the palm oil stearin is contacted with steam to help vaporise the impurities or, alternatively, the deodorising step may be carried out at elevated temperature and a pressure of no greater than, for example, 10 mm Hg.

Step (d) in the process of the present invention is preferably carried out in the presence of an enzyme, preferably a 1,3 specific lipase. During the reaction of the second glyceride with the oleic acid fraction, the fatty acids on the 2-position of the second glyceride typically do not change (for example, less than 10% by number (or moles) of fatty acyl groups in the 2-position, more preferably less than 5%, such as less than 1%) change during the process.

Under the influence of the 1,3 lipase during step (d), oleoyl residues are introduced into the 1- and 3-positions of the triglyceride by exchange with the fatty acid residues of the triglyceride. Exchange preferably takes place between oleic acid or its esters and the glyceride. The 2-palmitoyl glycerides modified in this way may be separated from the reaction mixture.

The reaction in step (d) in the process of the present invention selectively exchanges palmitic acid with oleic acid on the 1,3-position rather than the 2-position. The transesterification reaction is performed to reach or approach equilibrium at a conversion ratio to 1,3-dioleoyl 2-palmitoyl glyceride of a minimum of 50%, preferably at least 60%, most preferably at least 70% by moles based on the triglyceride.

Preferably, in step (d), palm oil stearin as triglyceride is, for example, mixed with an oleic acid concentrate (comprising free oleic acid at a concentration of greater than 65% by weight, preferably greater than 70% by weight, most preferably greater than 75% by weight). The ratio of palm oil stearin to oleic acid concentrate is preferably from 0.1:1 to 2:1, more preferably from 0.4:1 to 1.2:1, even more preferably from 0.4:1 to 1:1, most preferably from 1:1.1 to 1:2 on a weight basis. The reaction is preferably carried out at a temperature from 30° C. to 90° C., preferably from 50° C. to 80° C., such as around 60° C. to 70° C., and may be conducted batchwise or in continuous fashion, with or without a water-immiscible organic solvent.

Before the reaction, the humidity is preferably controlled to a water activity between 0.05 and 0.55, preferably between 0.1 and 0.5, depending on the type of biocatalyst enzyme system used. The reaction may be performed, for example, at 60° C. in a stirred tank or in a packed bed reactor over biocatalysts, based on concentrates of Lipase D (*Rhizopus oryzae*, previously classified as *Rhizopus delemar*, from Amano Enzme Inc., Japan) or immobilised concentrates of *Rhizomucor miehez* (Lipozyme RM IM from Novozymes, Denmark).

Similar reaction conditions to those used in step (d) may be used in step (a).

The 1,3-dioleoyl 2-palmitoyl glyceride obtained in step (d) is preferably subjected to a further step in which it is purified. In order to separate the fatty acids and esters from the product triglyceride fraction, the composition obtained in step (d) (optionally after further treatment, such as isolation of the fat phase) may be distilled at low pressure (<10 mbar) and elevated temperatures (>200° C.).

After distillation of the composition obtained in step (d), the triglyceride fraction is preferably fractionated to recover the OPO glyceride. This can be done using solvent fractionation or dry fractionation, using a single, two-step or multi-step fractionation technique, but is preferably carried out using single step dry fractionation. Fractionation preferably removes the unconverted tri-palmitins down to a level of less than 15 weight %, preferably less than 10 weight %, most preferably less than 6 weight %. The OPO fraction is typically fully refined to remove all remaining fatty acids and contaminants to produce a refined OPO fraction.

The invention may comprise one or more additional steps of further purifying the 1,3-dioleoyl 2-palmitoyl glyceride.

The process may optionally comprise further steps before, between or after (a) to (d), such as partial purification or enrichment of the products in the desired component(s).

The composition comprising OPO glycerides that is produced by the process of the present invention may comprise OPO glycerides preferably in an amount of at least 50% by weight, more preferably at least 60% by weight. The balance comprises other non-OPO triglycerides. The composition comprises a mixture of triglycerides wherein different fatty acid residues, including unsaturated fatty acid residues, are randomly distributed between the 1- and 3-positions and at least half of the fatty acid residues in the 2-positions are C16 and/or C18 saturated, preferably consisting substantially of palmitic acid residues, in particular 60-90% by weight of the total 2-position fatty acids. Preferably all of the fatty acid residues, or virtually all (e.g., greater than 99% by weight), are even-numbered. The unsaturated fatty acid residues in the 1- and 3-positions preferably consist largely of oleic acid, linoleic acid and palmitic acid. The compositions preferably includes at least as much (on a molar basis) of saturated fatty acid in the 2-position as in the 1- and 3-positions combined, more preferably up to twice as much (on a molar basis). Preferably, the 1,3-positions include both unsaturated C18 and saturated C4 to C14 fatty acids. The proportion and type of these fatty acids may be determined in accordance with dietary and physical requirements of the composition required. For example, milk replacement fats should be capable of emulsification at blood heat in liquid feed and should therefore preferably be capable of being melted at this temperature (37° C.). The melting point of fats is determined by their fatty acid composition, which may be selected accordingly. Fats with the correct fatty acid composition may be selected for use in the present invention, therefore, with a view to producing fat compositions with certain desired physical characteristics.

The most preferred compositions produced by the present invention are those comprising OPO glycerides comprising at least 50 wt % palmitic acid present in the sn-2 position, less than 8 wt % SSS wherein S represents saturated fatty acid having at least 18 carbon atoms, preferably 18 carbon atoms, and at least 40 wt % oleic acid residues in the 1 and 3 positions.

The composition obtained by the process of the present invention contains preferably less than 10% by weight 1,2,3-trisaturated glycerides, preferably less than 8% by weight 1,2,3-trisaturated glycerides.

The process of the present invention may comprise the further step of blending the OPO fraction with other fats and/or oils, preferably at least one vegetable oil, to form fat blends. Suitable fats are fats comprising up to 40 wt % of medium-chain triglycerides; up to 30 wt % of lauric fats; up to 50 wt % of other vegetable fats; or up to 40 wt % of butterfat; or fractions or mixtures of these fats. In particular, lauric fats, preferably palm kernel oil, may be included in the compositions to provide blends matching the compositions of milk fat or its melting characteristics, and/or vegetable oils such as sunflower oil, high oleic sunflower oil palm kernel oil rapeseed oil, high oleic safflower oil, coconut oil and soybean oil which have a high content of polyunsaturated fatty acid glycerides, which improve the dietary benefit of the compositions, may be included. In this way, the compositions produced by the process of the invention preferably provide blends matching the composition of milk fat or its melting characteristics. The best compositions are obtained when the Solid Content Index measured by NMR-pulse on non stabilised fats are within the following ranges: N0=35-55; N10=25-50 and N30</=10. These values were obtained by melting the fat at 80° C., holding the fat at 60° C. or higher for at least 10 minutes, cooling to 0° C. and holding the fat at 0° C. for 16 hours, heating the fat to the measurement temperature N and holding the fat at that temperature for 30 minutes before measuring the N value.

The fat compositions or fat blends produced by the process of the invention are suitable for replacing at least a part of the fat in infant food formulations. The present invention also therefore provides for a method for the production of infant food compositions comprising fat, protein and carbohydrate components in the approximate relative weight proportions 2.5:1:5, wherein at least a part of the fat normally used in such formulations is replaced by the fat composition or fat blend made in accordance with the present invention. Dry formulations containing this mixture, together with additional components customary in such formulations, should be dispersed for use in sufficient water to produce an emulsion of approximately 3½ grams of fat per 100 ml of dispersion. Therefore, in another aspect, the invention provides a method of producing an infant food formulation by packaging and labelling the composition comprising OPO triglyceride obtained after step (v) of the process.

The following non-limiting example illustrates the invention and does not limit its scope in any way. In the examples and throughout this specification, all percentages, parts and ratios are by weight unless indicated otherwise.

EXAMPLE

Triolein is reacted with an excess of stearic acid in the presence of 2% by weight (based on the weight of triolein) of a 1,3-specific lipase for example RML (Lipase from *Rhizomucor miehei*) or RDL (Lipase from *Rhizopus delemar*) to obtain 1,3-distearoyl-2-oleoyl glyceride, unconverted trioleoyl glyceride and other stearic acid containing glycerides. The reaction is performed at 50° C. under string and vacuum to remove the water formed during the reaction. The different triglyceride fractions are separated by dry fractionation under standard conditions. The oleoyl rich glyceride fraction is hydrolyzed in water (Solution: 60% by weight) with an unspecific lipase 0.2% CRL (*Candida rugosa* lipase) (based on weight % of oleoyl glyceride). The reaction is preformed at 40° C. under stirring. The oleic acid rich free fatty acids are removed by short path distillation and are converted with tripalmitin to 1,3-dioleoyl-2-palmitoyl-glyceride under the following reaction conditions: solvent free, under vacuum to remove water in the presence 2% (based on the weight of tripalmitin) of a 1,3-specific lipase such as RML or RDL. The reaction is performed under stirring at 50° C.

The invention claimed is:

1. A process for producing triglycerides which comprises:
   (a) subjecting a first triglyceride comprising at least 40% by moles of oleic acid residues, based on total acyl groups in the triglyceride, to a reaction with stearic acid, at least one ester of stearic acid or a mixture thereof, to obtain a composition comprising 1,3-distearoyl 2-oleoyl glyceride and trioleoyl glyceride;
   (b) treating the composition to form a first fraction having an increased amount by weight of oleoyl groups compared to said composition and a second fraction having an increased amount by weight of stearoyl groups compared to said composition;
   (c) hydrolysing the first fraction to form oleic acid; and
   (d) reacting said oleic acid or an ester thereof with a triglyceride comprising at least 50% by moles of palmitic acid residues, based on total acyl groups, to form a composition comprising 1,3-dioleoyl 2-palmitoyl glyceride.

2. Process as claimed in claim 1, wherein the second fraction is treated such that it is enriched in 1,3-distearoyl 2-oleoyl glyceride.

3. Process as claimed in claim 1, wherein (a) and/or (d) is or are carried out in the presence of an enzyme.

4. Process as claimed in claim 3, wherein the enzyme is a lipase.

5. Process as claimed in claim 1, wherein the first triglyceride is high oleic sunflower oil (HOSF) or a fraction thereof.

6. Process as claimed in claim 1, wherein the 1,3-distearoyl 2-oleoyl glyceride is purified.

7. Process as claimed in claim 1, wherein the 1,3-dioleoyl 2-palmitoyl glyceride is purified.

* * * * *